United States Patent
Crickmore et al.

(10) Patent No.: US 8,797,824 B2
(45) Date of Patent: Aug. 5, 2014

(54) PHASE BASED SENSING

(75) Inventors: Roger Ian Crickmore, Wareham (GB);
Jolyon DeFreitas, Paignton (GB); Philip John Nash, Guilford (GB)

(73) Assignee: Optasense Holdings Ltd. (GB)

( * ) Notice: Subject to any disclaimer, the term of this patent is extended or adjusted under 35 U.S.C. 154(b) by 549 days.

(21) Appl. No.: 12/999,115

(22) PCT Filed: Jun. 15, 2009

(86) PCT No.: PCT/GB2009/001480
§ 371 (c)(1),
(2), (4) Date: Dec. 15, 2010

(87) PCT Pub. No.: WO2010/004249
PCT Pub. Date: Jan. 14, 2010

(65) Prior Publication Data
US 2011/0096623 A1    Apr. 28, 2011

(30) Foreign Application Priority Data
Jun. 16, 2008    (GB) .................................. 0810977.9

(51) Int. Cl.
*G01V 1/00* (2006.01)
*G01V 1/24* (2006.01)

(52) U.S. Cl.
CPC ........................................ *G01V 1/24* (2013.01)
USPC .......................................... 367/13; 356/73.1

(58) Field of Classification Search
USPC ..................................... 367/13, 178; 356/73.1
See application file for complete search history.

(56) References Cited

U.S. PATENT DOCUMENTS

| | | | |
|---|---|---|---|
| 4,515,430 A | 5/1985 | Johnson | |
| 4,752,132 A | 6/1988 | Pavlath | |
| 5,757,720 A | 5/1998 | Soubaras | |
| 7,999,946 B2 * | 8/2011 | Andersen et al. | 356/479 |
| 8,248,589 B2 * | 8/2012 | DeFreitas et al. | 356/73.1 |
| 8,537,345 B2 * | 9/2013 | Crickmore et al. | 356/73.1 |
| 8,564,786 B2 * | 10/2013 | Crickmore et al. | 356/477 |
| 2003/0043696 A1 | 3/2003 | Vakoc | |
| 2003/0043697 A1 | 3/2003 | Vakock | |
| 2005/0135815 A1 * | 6/2005 | Gerwe et al. | 398/188 |
| 2008/0080311 A1 * | 4/2008 | Eperjesi et al. | 367/77 |
| 2011/0149295 A1 * | 6/2011 | Crickmore | 356/477 |

FOREIGN PATENT DOCUMENTS

| | | |
|---|---|---|
| EP | 0 074 204 | 3/1983 |
| JP | 2005 073424 | 3/2005 |
| JP | 2007-139482 | 6/2007 |
| WO | WO 2003/014674 | 2/2003 |
| WO | WO 2003/014774 | 2/2003 |
| WO | WO 2008/110780 | 9/2008 |
| WO | WO 2009/007694 | 1/2009 |

* cited by examiner

*Primary Examiner* — Krystine Breier
(74) *Attorney, Agent, or Firm* — McDonnell Boehnen Hulbert & Berghoff LLP (57) ABSTRACT

A method of sensing using a phase based transducer in which a transducer response is provided at multiple different levels of sensitivity. The different levels of sensitivity are used to produce an output which does not overscale across a wide range of signal levels. This is particularly useful for use in conjunction with multiplexed arrays of fiber optic sensors for seismic surveying. Methods of sensor calibration and noise reduction are also described.

15 Claims, 7 Drawing Sheets

PHASE BASED SENSING

FIELD OF THE INVENTION

The present invention relates to sensors which exploit a change in phase of an interrogation signal to determine a sensed parameter, and particularly, but not exclusively to fibre optic interferometric sensing. The present invention finds particular application in the field of seismic surveying and imaging.

BACKGROUND OF THE INVENTION

Fibre optic sensors employ a length of optic fibre arranged in such a way that a sensed parameter causes a strain to be imposed on the fibre. Typically the fibre is arranged in a coil, although other arrangements are possible. Such strain causes a change in phase of the optical signal propagating in that fibre, which change can be detected by interferometric techniques. A variety of different arrangements for this type of transducer have previously been proposed, many of which have the coil of optic fibre wound on a deformable core or mandrel, which undergoes radial expansion or contraction in response to the sensed parameter, such as sensed vibration.

Such fibre optic sensors can exhibit extremely high sensitivities, and have the advantage of being completely passive, employing no power at the sensing transducer. Such sensors have also proved popular in applications where large arrays of sensors are required, on account of the relative ease with which they can be multiplexed.

An example of such an application is seismic surveying in the oil and gas exploration industry, where large time multiplexed arrays comprising hundreds or even thousands of vibration sensors and/or hydrophones can be used to sense reflections of an incident pulse from geological formations beneath the sea bed. Sampling such an array at regular periods provides 3D time lapsed data on existing or potential new reserves.

Figure 1:
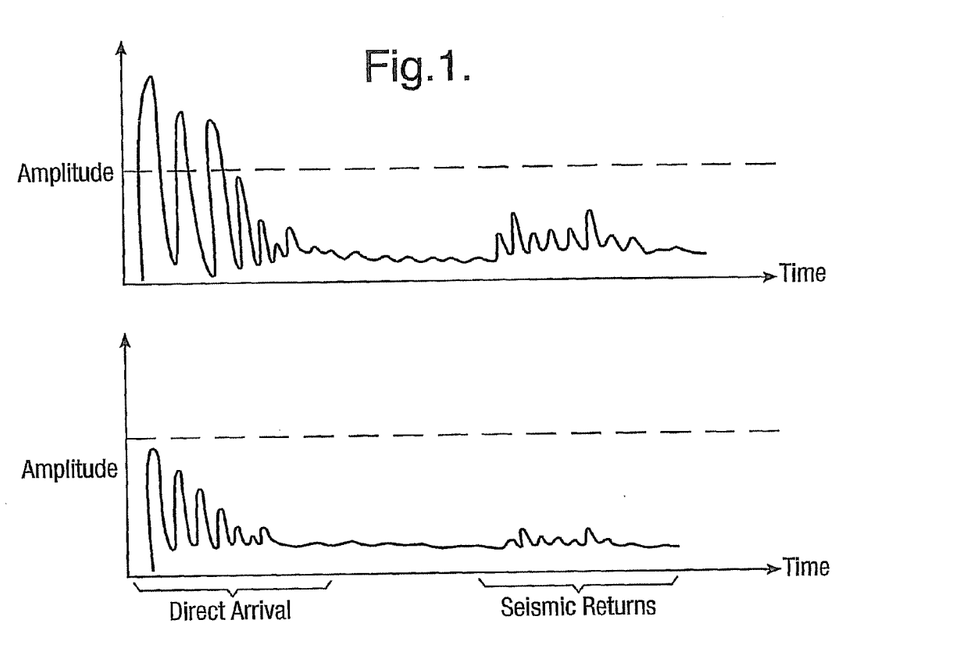
FIG. 1 are plots depicting the relationship between sensor output and time wherein an airgun in closer to the sensor in the top plot than in the bottom plot.

In greater detail, a high amplitude seismic source (usually an airgun) is towed across the top of a (known or potential) oilfield, firing the source at regular intervals, and the reflected returns form the source are monitored using sensors which are either towed together with the source or are positioned on the seabed. It is desired to be able to measure directly both the direct signal from the airgun when it first hits the sensors (which is a very high amplitude), and the seismic returns reflected from the underground features within the field (which are much lower amplitudes). Two examples of the relationship between the sensor output and time are shown in FIG. 1. In the top plot, the airgun is closer to the sensor than in the lower plot, and the amplitude of the signal is correspondingly greater. The large variations of sensor output at the left-hand side of the graph represent the direct signal from the seismic source impinging on the sensor. After a short interval of little activity, the smaller variation sensor outputs at the right hand side represent seismic returns from underground formations detected by the sensor A problem experienced with this approach to sensing is that, for a given sampling rate, signals above a certain amplitude threshold cause the phase based sensed information to become distorted, and can cause failure of the demodulation process. This effect, commonly referred to as overloading or overscaling is dependent on the frequency of the measured signal. In seismic systems this can cause a particular problem with the direct arrival of the incident pulse, which is used to determine the orientation of the sensors with respect to the source. This is especially true when the pulse has been generated close to the sensors, however at greater ranges even the direct arrival may not be overscaled. It is desirable to be able to record this incident pulse without the distortion that overscaling can produce.

SUMMARY OF THE INVENTION

It is a general object of the present invention to provide improved methods and apparatus for sensing and for processing sensor signals, and an object of certain embodiments of the invention to provide improved methods and apparatus for sensing using a multiplexed fibre optic sensor array.

According to a first aspect of the invention, there is provided a method of sensing using a phase based transducer comprising providing a plurality of signals representative of the transducer response, said plurality of signals having different sensitivities, determining a value of amplitude of the transducer response using at least one of said signals, and based on said value, using one or more signals of different sensitivities to provide a sensed output.

By providing a number of different signals of varying sensitivities in this way, a composite signal can be produced which allows all the phase and amplitude of both the seismic returns and the direct arrivals to be known to the required accuracy across a full range of signal levels. In the case of seismic surveying as described above, direct arrival and seismic returns at all practical ranges can be resolved.

In certain embodiments, multiple sensitivity signals are obtained from single sensing elements. In the case of a hydrophone or accelerometer for example, multiple sensitivities are obtained, substantially simultaneously, for signals corresponding to the sensed output of each sensing coil of fibre. Such embodiments allow a time varying data output, with data of multiple different sensitivities at each time instance, to be obtained from each sensor element. This is obtained without the need to provide multiple sensing elements at each sensor location, corresponding to multiple required sensitivities. Embodiments of the invention having three or more, or even four or more different sensitivities have been found to be advantageous.

A further aspect of the invention provides a method of calibrating a sensor arrangement adapted to sense a signal emitted from a signal source through a propagation medium, said method comprising:
 (a) providing an initial sensor sensitivity
 (b) determining, based on the signature of the signal and known propagation conditions, the range at which the output from a sensor of said sensitivity will overscale.
 (c) determining the lowest sensor sensitivity which will provide required SNR at said range
 (d) repeating steps (b) and (c) until minimum required range is reached.

The invention extends to methods, apparatus and/or use substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

DESCRIPTION OF THE INVENTION

Preferred features of the present invention will now be described, purely by way of example, with reference to the accompanying drawings.

Overscale can be defined generally as the loss of tracking of phase in any phase detection system, when the measurement bandwidth of the system is exceeded. It can appear in any phase based system, but is here described in reference to optical systems, and in particular fibre optic fibre sensor systems used for seismic measurement In optical systems, overscale can manifest itself in different ways depending on how the system is multiplexed.

Figure 2:
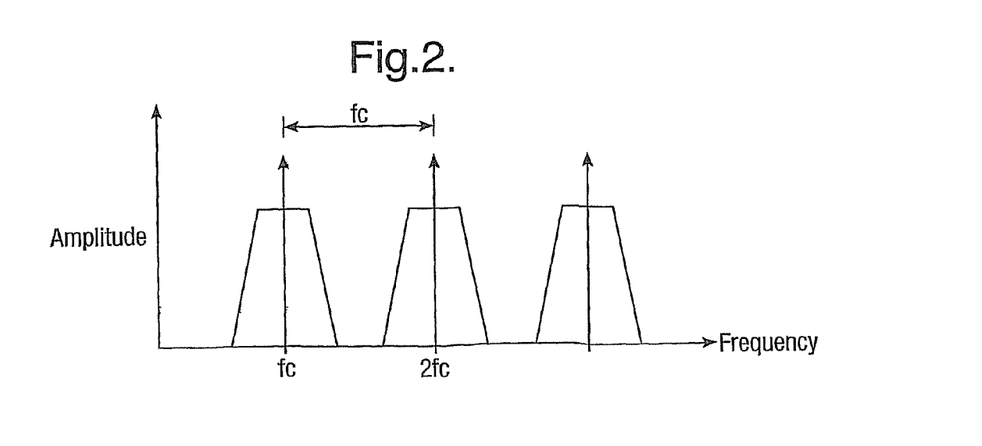
FIG. 2 shows the return from a frequency multiplexed system.

In a frequency multiplexed system, a number of sensors are continuously interrogated at different carrier frequencies. The return from a frequency multiplexed system is as shown in FIG. 2. The signal to be detected is carried as phase modulation around each carrier frequency. The allowable bandwidth for each signal is equal to the carrier frequency fc. The frequency bandwidth occupied by each signal increases as the amplitude and frequency of that signal increases. If the bandwidth exceeds the allowable system bandwidth, then overscale will occur. This will manifest itself in this case as a combination of amplitude distortion and potentially crosstalk between sensors.

In a time multiplexed optical system, each sensor is optically sampled at a fixed time interval (typically set by the physical sensor arrangement), In a typical system the time interval between samples might be around 5 microseconds. For the system to fully keep track of phase, the optical phase change between successive optical samples needs to be less than $\pi/2$. If this threshold is exceeded, then an ambiguity in the phase is introduced, and an overscale condition will occur.

A variety of techniques can be employed to provide sensor output signals at differing sensitivities.

One method is to optically multiplex together a number of sensors which have been mechanically designed to have different phase sensitivities. In the case of accelerometers, different sensitivity optical devices can be constructed by using sensors with identical dimensions, but different seismic masses (the sensitivity of an accelerometer is directly proportional to the seismic mass of the accelerometer). For instance, if accelerometer A used a tungsten mass, and Accelerometer B was otherwise identical but used an aluminium mass with approximately one fifth the density, then Sensor A would be fives times the sensitivity of Sensor B. If the optical sensors were hydrophones, then the sensitivity could be changed by changing the thickness and/or material properties of the mandrel (tube) on which the fibre is wound. The change in sensitivity is caused by the resulting variation in stiffnesses. The different sensitivity sensors could then be combined by optically multiplexing them together using well understood techniques such as time and frequency multiplexing.

Figure 3:
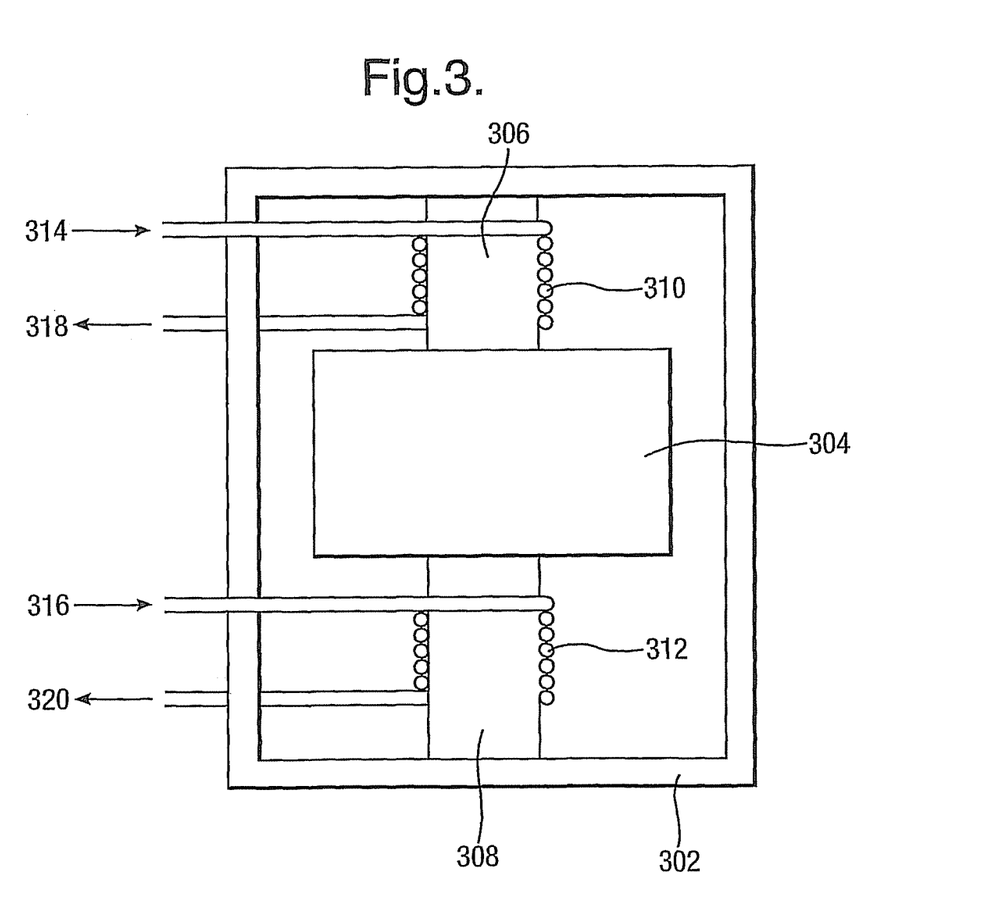
FIG. 3 is an optical sensor having two sensitivities.

An alternative is a balanced sensor technique. It is possible to construct an optical sensor with outputs, which can be combined together in different ways to produce effectively a sensor with 2 sensitivities. Such a sensor is shown in FIG. 3.

The sensor is an accelerometer comprising a can 302 containing a seismic mass 304 placed between two springs 306, 308 (eg a compliant cylinder) attached to the top and bottom of the can, each of which has a fibre coil 310, 312 wound around it. If the can is subject to vibration with at least a component along the spring axis, then one spring will be compressed and the other expanded. One of the fibres coils will also therefore be correspondingly compressed and the other extended in length. If optical signals 314, 316 are independently passed through each coil, then one of the optical signals will undergo a negative phase shift at output 318 and the other one will undergo an equal positive phase shift at output 320, or vice versa. If the 2 optical phase shifts are subtracted, then the net phase shift between them is twice the phase shift in one coil—if they are added then the phase shift is zero (provided that both springs work in exactly the same way). By introducing a slight difference in the stiffness of the springs, the added output of the two coils will be a small but non-zero phase change. It would also be possible to produce a non-zero output by electronically adjusting the scaling of one of the optical channels before subtraction.

It is possible therefore to produce a sensor which has a high sensitivity if the 2 outputs are subtracted, and a low sensitivity if they are added, and where the sensitivity can be tailored by adjusting the relative stiffness of the springs. In order to prevent the low sensitivity version from overscaling the addition of the phase shifts must take place before the optical signal is sampled Applicant's co-pending patent applications WO 2008/110780 and WO 2009/007694 describe techniques which address the problem of overscaling in time multiplexed fibre optic sensing systems, by providing an output having reduced sensitivity. The described techniques relate to sensors which provide a response in the form $\cos(\omega_c t + \phi(t))$ where $\phi(t)$ is the sensed parameter, i.e. the sensed information is represented as a phase change superimposed on a carrier signal of frequency $\omega_c$. Techniques that are well known to those skilled in the art can then be used to demodulate the phase signal from the carrier. Examples of time multiplexed pulsed interferometric fibre optic sensor arrays are provided in the above referenced applications.

The carrier frequency is typically chosen to be half of the Nyquist frequency, which is in turn half of the sampling frequency. It is usual for one sample to be made in each returning optical pulse and so the sampling frequency is the rate at which pulse pairs are transmitted into the array. By way of an example, the sampling frequency could be approximately 320 KHz, giving a Nyquist frequency of approximately 160 KHz and a carrier frequency of approximately 80 KHz. The sampling frequency will typically have a practical upper limit dependent upon the type and arrangement of sensor or sensors, amongst other factors.

An overscale condition occurs when the instantaneous frequency of the phase modulated carrier falls outside the Nyquist band i.e. when $$\frac{d\varphi(t)}{dt} \geq \omega_N - \omega_c \text{ or when } \frac{d\varphi(t)}{dt} \leq -\omega_c,$$

where $\omega_N$ and $\omega_c$ are the Nyquist and carrier frequencies (in radians/s) respectively. In practice this results in aliasing of instantaneous frequency back into the Nyquist band by folding or wrapping around one of its limits in frequency space. Depending on the magnitude and frequency of the sensed parameter, the instantaneous frequency can be wrapped back multiple times. If the sensed parameter is modelled approximately as $\phi(t)=\phi_0 \cos \omega_m t$, then the condition for overscale not occurring, for the usual condition of $\omega_N=2\omega_c$ is sometimes expressed as $$\varphi_0 \leq \frac{\omega_c}{\omega_m}.$$

Figure 4:
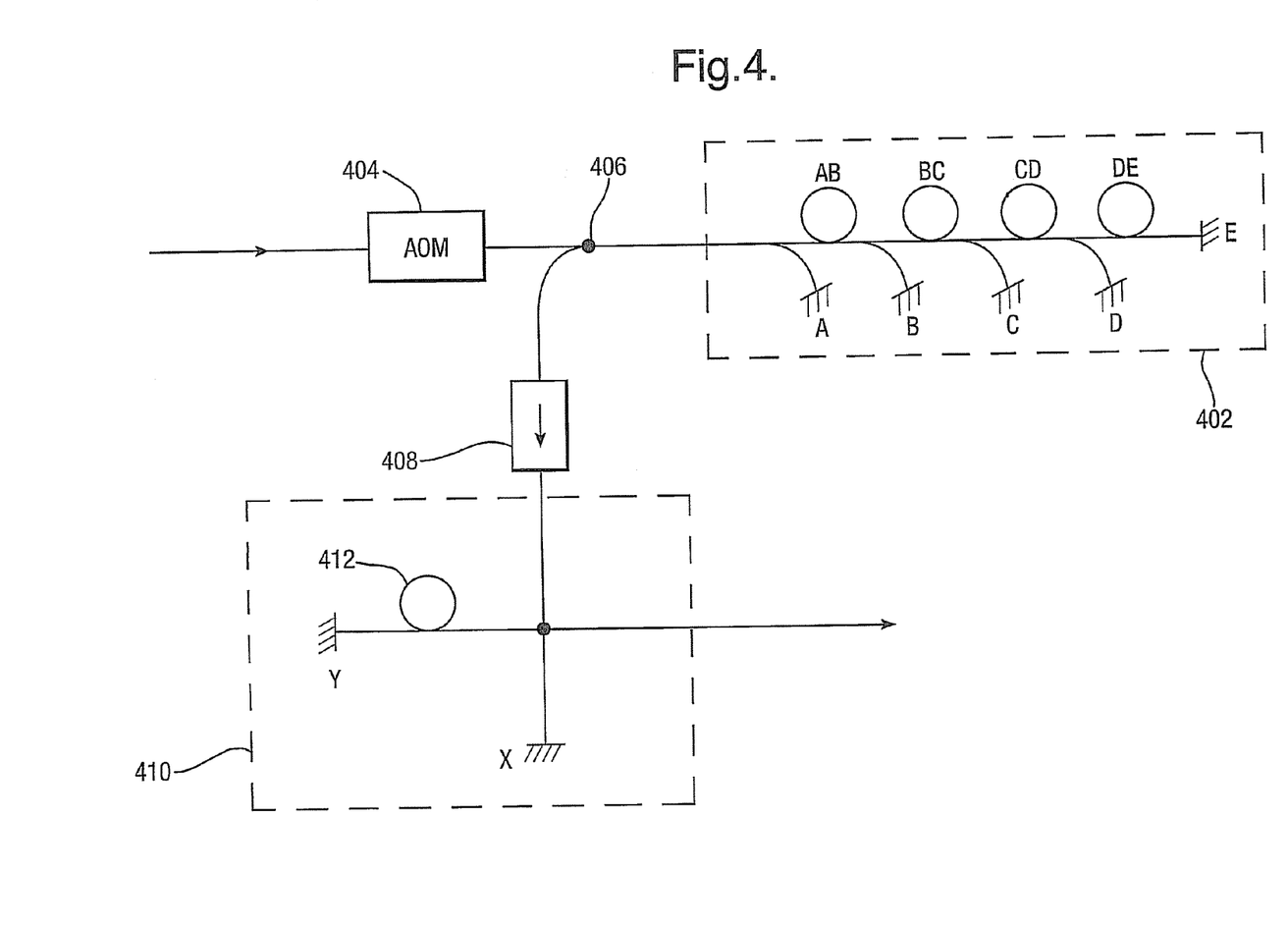
FIG. 4 illustrates the interrogation of a sensor package of a particular type.

FIG. 4 illustrates interrogation of a sensor package as described in WO 2008/110780. The package 402 is interrogated by a pair of pulses produced by acousto-optic modulator 404. The output series of pulses is tapped off at junction 406, passed through an isolator 408, and to output interferometer designated by 410. In the scheme of FIG. 4, the delay between input pulses is arranged to be twice the time of flight of light through delay coil 412 of the output interferometer. While the described embodiment employs a Michelson interferometer, the skilled reader would recognise that a Mach-Zehnder type interferometer with a delay coil in one of the arms could equally be used. In this case, arranging for the separation between the input pulses to be just the time of flight through the delay coil in one arm of the interferometer would allow equivalent measurements to be made.

It can be seen that, in this way, interferometer 410 temporally aligns and interferes pairs of pulses, both of which have passed through the same sensing coil(s) of package 402, but at different times. In other words, each pulse reflected off fibre coupled mirrors B to E (pulses reflected off mirror A have not passed through a sensing coil), and gathering information on the associated sensing coil, is combined with a pulse having undergone the same optical path, gathering the same information, but at a later time. The output of the interferometer therefore represents the derivative of the phase value, in contrast to the actual value of phase which would usually be measured directly. Thus using the terminology above, if the signal returned from the transducer is $\cos(\omega_c t+\phi(t))$ with $\phi(t)$ being a measure of the sensed parameter, the system depicted in FIG. 4 derives a value representative of $$\frac{d\varphi(t)}{dt},$$

or the instantaneous frequency of the returned signal.

The rate of change, or derivative of the phase change typically has a much smaller amplitude than the signal itself since the difference between the two times at which the signal is measured will usually be much less than the period of the signal being measured. Thus the derivative sensor technique (DST) provides a reduced sensitivity measurement.

WO 2008/110780 describes how both normal (high sensitivity) sensor output, and an output which is the derivative (rate of change) of the optical signal can be provided simultaneously. This derivative signal has a much lower amplitude than the normal optical signal, and because it is a measure of the rate of change of the normal signal, has a response which effectively increases in amplitude as a function of frequency. The exact amplitude difference between the normal and the derivative channels depends on the separation of the 2 optical pulses which are used to generate the derivative signal, but for a typical set of parameters, the amplitude of the derivative signal is 66 dB lower than the normal signal at 800 Hz, and then reduces at 6 dB per octave, so that it is 84 dB lower at 100 Hz.

WO 2008/110780 also describes other means of generating derivative signals with different amplitudes by using a different optical return architecture, employing optical pulses with different separations, where the length of separation determines the amplitude of the channel. This can result in derivative outputs with levels which are approximately 56 dB lower at 800 Hz (described as "medium DST") and 38 dB lower at 800 Hz (described as "long DST")

Figure 5:
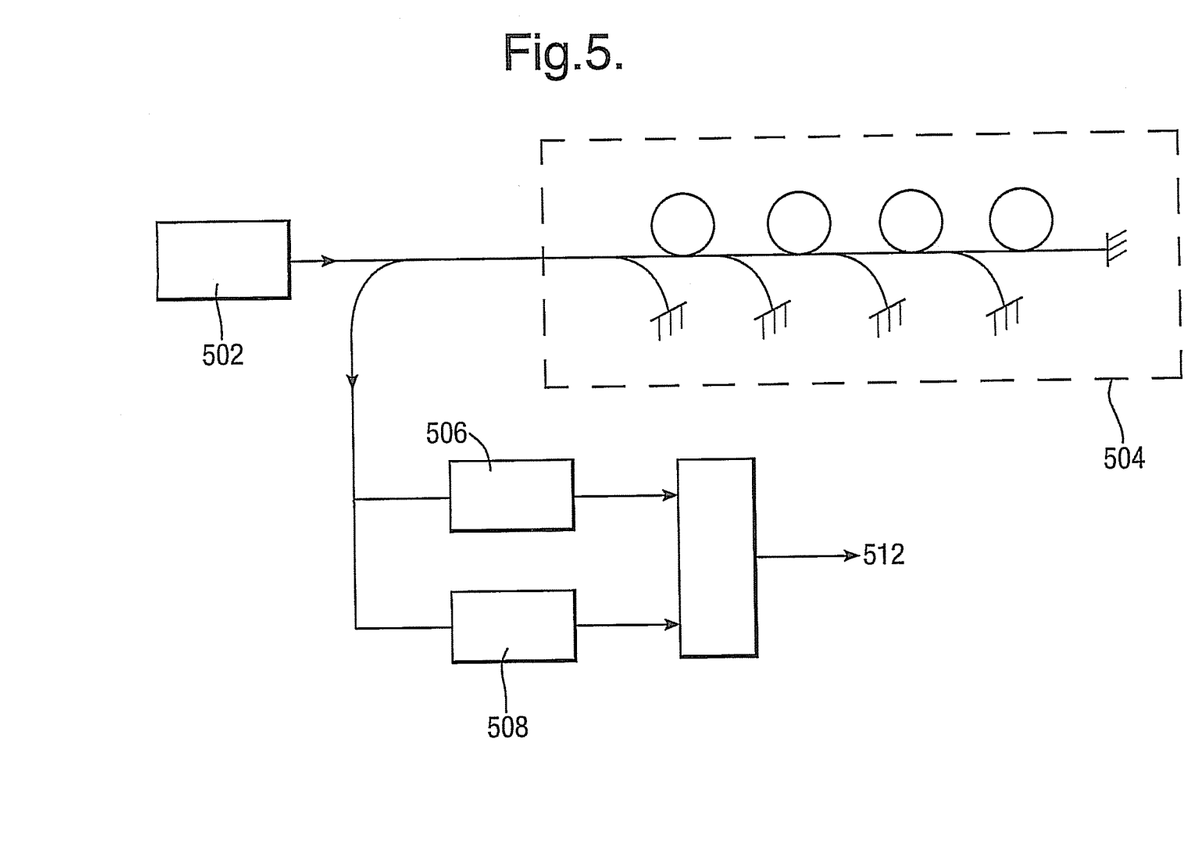
FIG. 5 is an optical sensor including the combination of normal, short and long derivative sensor techniques.

There therefore exists a class of DST techniques, each of which can generate an optical signal of a different sensitivity. Several of these techniques can be implemented simultaneously. For example, FIG. 5 shows an optical architecture in which optical input signals are generated at an optics transmit stage 502 and input to sensor package 504 which includes a number of fibre sensor coils. The optical output of the package consists of a long DST interferometer 506 and a short DST interferometer 508. The interferometer outputs enter an output stage 510 which allows Long DST and Short DST to be implemented simultaneously and gives both the relatively insensitive Short DST and the relatively sensitive Long DST, as well as the highly sensitive normal channels (derived from one of the interferometer outputs), as parallel time multiplexed data streams. The three signals of differing sensitivities can be processed to provide a single output 512 as will be explained below.

It is noted in WO 2009/007694, that the larger the interrogating wavelength, the smaller is the phase value returned, and hence the lower is the sensitivity to overscale problems. However there is a practical limit to the values of wavelengths which can be propagated through optic fibres, which are the preferred application for the present invention. By generating a synthetic wavelength from two or more significantly smaller wavelength components however, a synthetic phase measurement having reduced sensitivity is provided.

WO 2009/007694 proposes a synthetic wavelength technique (SWT) of inputting pulses into a transducer containing components of at least two different wavelengths. In this way, the transducer can be considered to operate in response to a synthetic wavelength produced by the combination of the two different input wavelengths, producing a synthetic phase output. By arranging for the synthetic wavelength to be significantly greater than either of the two component wavelengths, the synthetic phase is relatively small, and therefore less sensitive to overscaling. Methods and apparatus are described additionally to allow the normal output (based on a single interrogating wavelength) to be produced alongside the synthetic wave output.

Unlike the DST technique, for SWT the synthetic wavelength output is a true reduced sensitivity version of the normal signal (not a derivative) so has a sensitivity which is independent of frequency but is related to the difference between the 2 wavelengths. For typical allowable wavelengths, the synthetic wavelength technique will give an output which is 60 dB lower than the normal signal across all frequencies. Again, it would be possible, by interrogating each sensor with more than 2 wavelengths, to simultaneously produce sensor outputs with a range of sensitivities.

An advantage of the DST and SWT described above is that a conventional fibre optic package (or an array of such packages) can be used to provide multiple sensitivity signals, with substantially little or no modification to the package. The particular manipulation of interrogating pulse timings and wavelengths described enable the apparent sensitivity of an individual sensor element to be varied. These techniques both employ methods and apparatus can operate on existing or legacy sensor hardware not specially adapted or intended to provide multiple sensitivities, and are thus particularly attractive in terms of practicality.

Many seismic systems use electrical rather than optical sensors. There are a number of possible ways of producing a range of sensor outputs of different sensitivities, some of them similar to those already described for optical sensors. For instance, a number of different sensors with different sensitivity could be used at each sensor location. Alternatively, a balanced accelerometer could be designed similar to the balanced optical sensor described above, where 2 electrical outputs could be added to give a high sensitivity sensor and subtracted to give a low sensitivity sensor.

An overscale recovery process should reconstruct accurately both the phase and amplitude of the direct arrival signals (and also the seismic reflections). The direct arrival signals are used for calculating the orientation of the sensors with respect to the source, and the phase and amplitude measurements must be sufficiently accurate to allow this orientation measurement to be made.

The various techniques described above allow a number (2 or more) of sensor outputs of varying sensitivities to be made available simultaneously. In general, it is desired to use the highest sensitivity sensor output which will not itself overscale at closest range. For a time multiplexed system, we need to ensure than even at close range to the seismic source, the phase change between successive samples of the optical phase on the low sensitivity signal will be less than pi/2.

If however we simply use the lowest sensitivity sensor output (eg the short DST approach) then we may not achieve the required signal/noise ratio to allow the direct arrival to be reconstructed to the required accuracy for orientation and other processing purposes. At longest range, therefore, we may need to use a higher sensitivity sensor output, which would not be suitable for use at shorter ranges (because it may overscale) but gives the required signal/noise ratios at the longer ranges where the source does not overload. At even longer ranges, even the normal (highest sensitivity) sensor output would not overscale, and so can be used directly.

Figure 6:
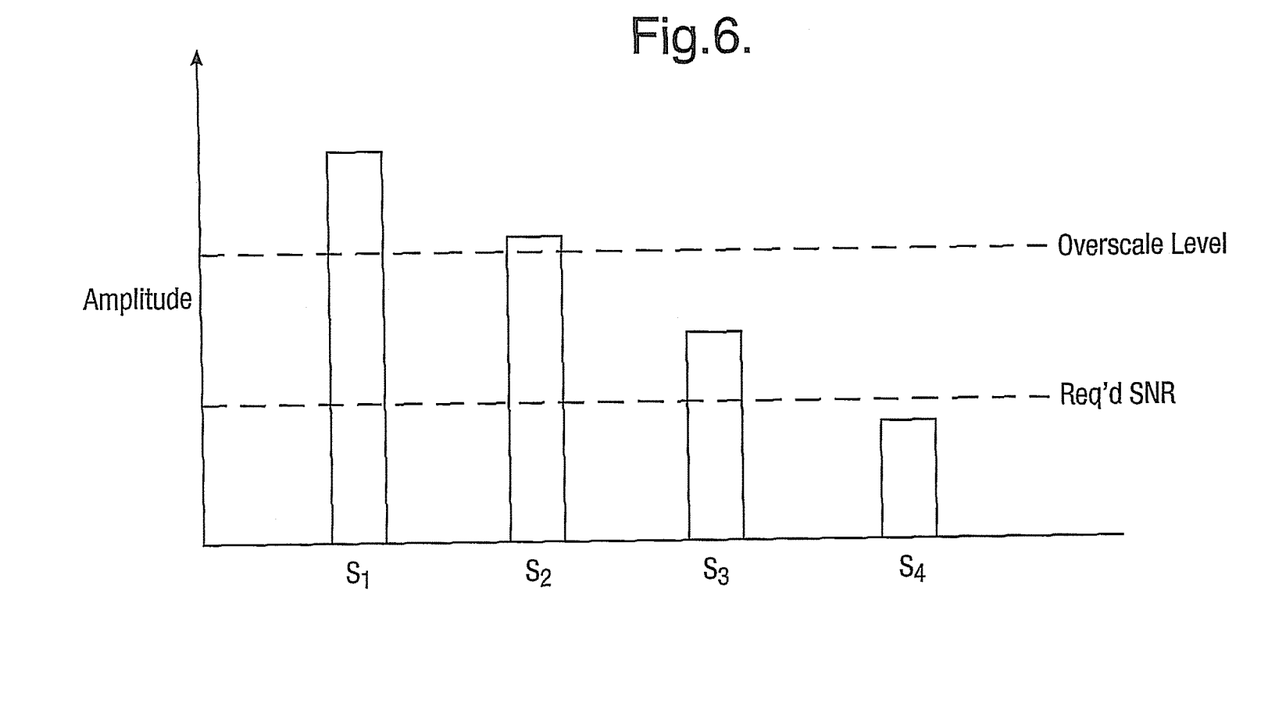
FIG. 6 is a plot of four outputs of varying sensitivities where the chosen output sensitivities decrease as the source gets closer to the receiver.

Thus, in most circumstances, we require at least 2. and possibly more, sensor outputs with varying sensitivities, and use successively lower sensitivity outputs as the source gets closer to the receiver. The general principle is illustrated in FIG. 6. Here we show 4 outputs of varying sensitivities in response to an incident signal. The design of the system should be such that at all important ranges there is at least one output available which is not overscaled and achieves the required signal/noise ratio.

Figure 7:
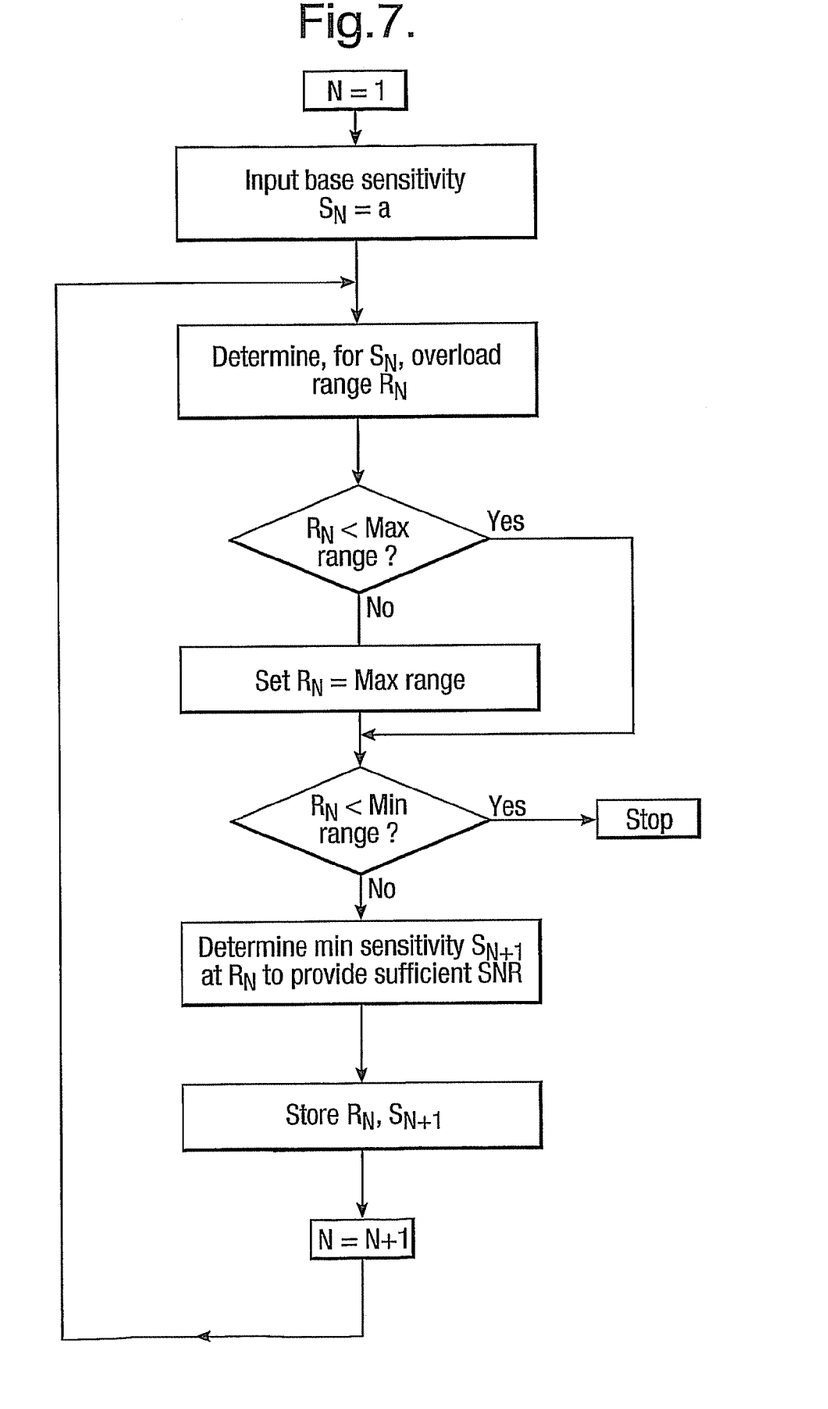
FIG. 7 is a flow chart illustrating a calibration method for calculating the overscale level and signal to noise ratio of sensor output types.

FIG. 7 is a flow chart illustrating a calibration method which can calculate the overscale level (that is, the number of times by which the phase change between successive samples exceeds pi/2) and the signal to noise ratio on all possible types of sensor output. The method is based on prior knowledge of the signature of the seismic source, the frequency response of each of the base sensor types we are using, and the acoustic propagation conditions in the ocean.

The method, which determines the number and sensitivities of the sensor channel outputs required for a given application can be described as follows:

1. At the largest range at which the direct arrival will overload the normal signal (highest sensitivity $S_1$), calculate the sensor output sensitivity $S_2$ required to produce an output which is not overscaled, and has the required signal/noise. If the largest range at which overload occurs is greater that the maximum range of interest then the latter range is used for the calculation
2. As the range to the seismic source decreases, calculate the level of overscale using output sensitivity $S_2$ as a function of range. When the overscale level using $S_2$ reaches 1. calculate an even lower output sensitivity $S_3$ which will not overscale and which will achieve the required signal/noise
3. Repeat step 2 until the minimum required range from the airgun is reached.

Steps 1 to 3 will generate a range of sensor sensitivity outputs $S_1 \ldots S_n$ where $S_1$ is the normal (highest sensitivity) signal and $S_n$ is the lowest sensitivity signal, which will be used close to the airgun. These outputs can be applied to a sensor arrangement (or the output of a sensor arrangement) to produce a system, and sensed outputs which are of the appropriate sensitivity to produced desired seismic information.

It should be noted that it may not be possible, using the various methods for producing different sensor outputs described above, to practically produce sensor outputs with exactly the sensitivities determined by the method, so in practice we will need to determine what sensitivities we can achieve which are close to the theoretical required sensitivities, and design a system based around these.

For instance, if we use the combination of normal, short and long DST shown in FIG. 5, then modelling shows that these 3 sensor channel outputs will for typical airgun and sensor frequency response give the required performance at all useful ranges. The output stage 510 of FIG. 5 adaptively combines the signals of different sensitivities For any particular shot of the seismic source, the output stage 510 of FIG. 5 determines the appropriate combination of different sensitivity signals to provide an appropriate output. The procedure can be summarised as follows for a single sensor however it will be understood that the same approach applies equally to multiple sensors.

In practice, referring to FIG. 1, for the seismic returns then the normal channel S1 will never be overscaled, and for all the seismic returns we will select the normal channel, which will always give the greatest signal/noise ratio. For time periods during the direct arrival, the normal channel may or may not be overscaled. During this period, the highest of the lower sensitivity inputs which is not overscaled is selected.

From the calibration method above, a system is provided with N inputs per sensor, with sensitivities $S_1 \ldots S_N$, where $S_1 > S_2 > S_N$, and where $S_1$ is the "normal" sensor output If the rate of change of phase is measured on the lowest sensitivity output, $S_N$, it could then be used to determine what the rate of change of phase will be on all other outputs, and therefore what is the phase change between successive optical samples dfn (knowing the relative amplitude relationship between S1, S2 etc).

The highest sensitivity output is chosen for which dfn<$\pi/2$ (the point at which dfn=$\pi/2$ can be defined as an overscale level of 1, Higher overscale levels correspond to greater multiples of $\pi/2$)

Figure 8:
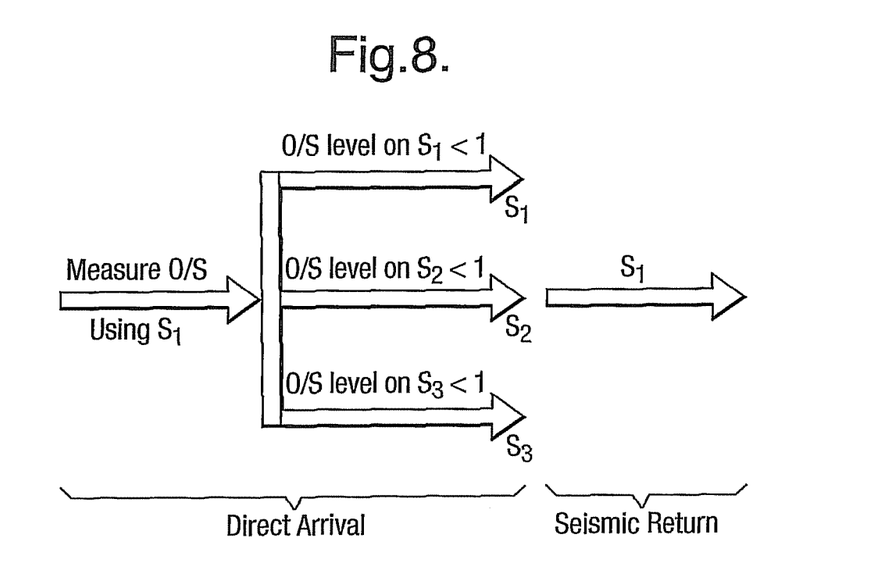
FIG. 8 represents the choice made in deciding which sensitivity to choose for direct arrival signals, whilst choosing the highest sensitivity signal for seismic returns.

The approach is represented in FIG. 8. The approach is illustrated for 3 sensor outputs, where S3 is the lowest sensitivity, S2 is an intermediate sensitivity, and S1 is the highest sensitivity (the normal channel). However, the same procedure can be extended to any number of sensor channel inputs If there are a large number of sensitivity outputs then the SNR of the lowest sensitivity output ($S_N$) may not be sufficient to accurately calculate whether much higher sensitivity outputs are overloaded. An alternative approach would be to use the $S_N$ output to determine whether the $S_{N-1}$ output will overscale, and if it does not then this can be used to calculate whether the $S_{N-2}$ output overscales. The process is then repeated until a sensitivity output $S_x$ predicts that the next higher sensitivity output $S_{x-1}$ will overscale in which case the $S_x$ output is used The following procedures can be used for making use of the selected lower sensitivity channel to recover the overscaled channel A first option is to use the selected lower sensitivity signal (or signals) with the optimum sensitivity level to determine the rate of change of the overscaled signal, and so allow reconstruction of the overscaled signal. Overscale occurs in a time multiplexed system because there is an ambiguity as to which Nyquist bands the instantaneous frequency of the signal lies in. Because the relationship between the non-overscaled low sensitivity channel and the overscaled channel is known, it is possible to use the non-overscaled channel to determine which Nyquist band the overscaled signal should actually be in, and then reconstruct the overscaled channel (this is known as frequency unwrapping)

Alternatively the selected low sensitivity signal can be substituted for the overscaled signal, on a sample by sample basis, for every point at which the normal signal is overscaled. Instead of using the non-overscaled channel to reconstruct the overscaled channel, it is possible to use non-overscaled channel directly, and to upscale it by an amplitude factor equivalent to the difference between the sensitivity of the 2 channels (if a derivative channel is being used, this will involve integration of the derivative signal, for other methods it may be a simple scale change). This process can be carried out on a sample by sample basis, so for each time sampled (typically at a 200 kHz sample rate) the process will determine whether the normal channel is overscaled, and if so substitute the highest available non-overscaled channel. In the DST case, the derivative signal can also be used without integration—this would result in use of the derivative of the seismic signal being used.

Rather than carrying out the substitution process outlined above on a sample by sample basis, the substitution could be carried out for every sample for a fixed time period following the first point of overscale. It is known from modelling of the signal that overscale is only likely to occur during the first arrival, and that within a fixed time period of the first overscale no more overscale will occur. It would potentially be simpler then to directly substitute the lower sensitivity signal (for the DST signal (either integrated or in its derivative form) for a fixed time period (typically this might be around 100 ms from the first onset of overscale). An alternative would be to estimate the period of time after the source fires during which overscale will occur (eg approximately 50 ms), and so use the firing of the source as a trigger to use the lower sensitivity channel, again for a fixed time period.

A further approach would be to use a low sensitivity output to determine the first and last times at which a higher sensitivity output is overscaled and then use the lower sensitivity output at all times between the two limits.

There have been described techniques and apparatus in which a phase output for one or more sensors is comprised of different sensitivity readings for different portions of time which have been 'stitched' together. Where a derivative signal is used to measure the phase resulting from an impulsive acceleration signal, such as the acceleration due to the direct arrival of an airgun pulse for example, an estimate of noise can be made to improve the SNR for that derivative signal, and the integrated signal which can be derived therefrom.

If we assume that noise in the derivative signal can be approximated by the equation $$n = a + 2bt \quad (1)$$

where $t=0$ is the time at midpoint of the direct acoustic pulse, which occurs between times $t=\pm r$ The acceleration at the beginning and end of the direct pulse can be assumed to be zero and hence the mean of the derivative of the acceleration during the pulse must also be zero. Thus if the mean of the derivative signal of is non zero we know that the value of a in equation 1 must equal this non zero value. This enables us to subtract this noise term from the derivative signal leaving the remaining noise as $$n_2 = 2bt \quad (2)$$

Thus an estimate for the steady state noise in the derivative signal can be removed from the derivative signal.

If we integrate equation 2 to give the noise in the acceleration we obtain $$n_a = k + bt^2 \quad (3),$$

where k is an arbitrary constant

The noise level from the normal signal that can be used before and after the direct pulse is much lower than that obtained from integrating the derivative signal and so can assumed to be zero. This provides a boundary condition, and to avoid discontinuity in the noise at the beginning and end of the direct pulse we require $k=-br^2$. The acceleration noise can then be written as:

$$n_a = b(t^2 - r^2), \quad -r < t < +r \quad (3a)$$

$n_a = 0$, otherwise

We also know that the velocity must be zero at the beginning and end of the direct pulse which means that the mean acceleration during the event must be zero. If the mean acceleration is not zero, the remaining noise is estimated to be of the form given in equation 3a where b is chosen so that after this noise term is subtracted the mean of the acceleration is zero.

In this way, an output portion of a sensor or sensor array based on a derivative measurement can be subject to noise reduction by calculating a constant noise term by imposing boundary conditions at the start and end of said portion, and then subtracting this term. The signal can then be integrated to provide a value of acceleration and a second order noise term can then be calculated, again based on imposed boundary conditions, and subtracted.

Although the estimate of the noise given by equation 3a is continuous at times $t=\pm r$, its derivative is not. To avoid this it would be possible apply some form of windowing function to the estimate and smooth out the sharp transitions at $t=\pm r$.

It will be understood that while the initial estimate of noise included only a first order time varying term, this method could be extended further by adding an extra term to equation 1 so that the noise of the derivative signal is approximated by the equation, $$n = a + 2bt + 3ct^2 \quad (4)$$

The fact that the net displacement of the accelerometer during the direct pulse is also zero can be used to obtain a value of c.

There is thus provided a method of reducing noise in a sensor output formed by combining at least two output portions each derived from sensor responses of different sensitivities, said method comprising providing an estimate of the noise in a selected portion and imposing boundary conditions at the limits of said selected portion. The noise estimate can then be subtracted from the output or its derivative to give a result having improved SNR. This method can be used in conjunction with the other aspects of the invention to provide improved sensor outputs.

The noise estimate can be based on knowledge of the nature of the signal being measured, and different forms of noise estimate will be appropriate for different sensor configurations. For example, the same technique could also be used to correct the derivative signal from a hydrophone, although as pressure is proportional to velocity the c term in equation 4 could not be used as there is no physical requirement for the mean displacement during the pulse to be zero.

In the case of SWT the low sensitivity signal is directly proportional to the normal signal instead of the derivative of it. Despite this difference, an estimate of the noise in the synthetic wavelength signal can be made applying the above techniques, using appropriate boundary conditions. For an accelerometer the noise could still be described by equation 1 but in this case it would refer to noise in the acceleration signal rather than the derivative of it.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A method of sensing using a phase based transducer comprising:
    providing a plurality of signals representative of the transducer response, said plurality of signals having different sensitivities,
    determining a value of amplitude of the transducer response using at least one of said signals, and
    based on said value, using one or more signals of different sensitivities to provide a sensed output.

2. A method according to claim 1, wherein signals of three or more different sensitivities are provided.

3. A method according to claim 1, wherein the lowest available sensitivity signal is used to determine said value of transducer response.

4. A method according to claim 1, wherein multiple sensitivity signals are obtained from a single transducer sensing element.

5. A method according to claim 4, comprising interrogating said transducer with a pulsed interrogation signal, and processing returned pulses to provide different sensitivities.

6. A method according to claim 5, wherein said interrogating signal includes components of multiple wavelengths.

7. A method according to claim 1, wherein said transducer includes a compound sensor, and partial signals from said compound sensor are combined prior to sampling of the output signal, in order to provide different sensitivities.

8. A method of sensing using a phase based transducer comprising:
    providing a plurality of signals representative of the transducer response, said plurality of signals having different sensitivities,
    determining a value of amplitude of the transducer response using at least one of said signals,
    determining, from said value of amplitude, a level of overscale for the signals at each level of sensitivity and
    based on said value, using one or more signals of different sensitivities to provide a sensed output.

9. A method of sensing using a phase based transducer comprising:
    providing a plurality of signals representative of the transducer response, said plurality of signals having different sensitivities,
    determining a value of amplitude of the transducer response using at least one of said signals, and
    based on said value, using one or more signals of different sensitivities to provide a sensed output wherein the highest sensitivity signal which is not subject to overscale is selected to be used to provide said sensed output.

10. A method according to claim 9, comprising using said selected signal to determine the degree to which a higher sensitivity signal has been overscaled, and reconstructing said higher sensitivity signal to provide said sensed output.

11. A method according to claim 9, comprising upscaling said selected signal to correspond to a higher sensitivity which is subject to overscale, and substituting said upscaled signal for said higher sensitivity signal which is subject to overscale.

12. A system for interrogating a phase based transducer comprising:
    a source for providing an interrogation signal to an input of said transducer
    a detector for receiving the signal output from the transducer in response to the interrogation signal, and
    a signal processor for providing a plurality of signals representative of the transducer response, said plurality of signals having different sensitivities, and using said plurality of signals adaptively to provide an output across a full range of sensed signal levels.

13. A system according to claim 12, wherein the processor provides signals of at least three different sensitivities.

14. A system according to claim 12, wherein the processor includes means for selecting one of said plurality of signals and determining an output value based on said selected signal.

15. A method of operating a seismic array, comprising:
    receiving a plurality of outputs of differing sensitivities from each sensor;
    determining a first value of each sensor output on the basis of one or more of said plurality of signals;
    selecting one or more of said plurality of signals on the basis of the determined first value of each sensor output;
    deriving a final value of the sensor output on the basis of said one or more selected signals; and
    producing seismic information by using the final values of the sensor outputs from the sensors in the array.

* * * * *